US005805399A

United States Patent [19]

Pacholok

[11] Patent Number: 5,805,399

[45] Date of Patent: Sep. 8, 1998

[54] APPARATUS FOR DETECTING LUMINOUS TUBE AND POWER SUPPLY FAULTS WHERE GROUND FAULT CURRENTS MAY BE ABSENT

[75] Inventor: David R. Pacholok, Sleepy Hollow, Ill.

[73] Assignee: Everbrite, Inc, Greenfield, Wis.

[21] Appl. No.: 709,276

[22] Filed: Sep. 6, 1996

[51] Int. Cl.[6] .......................... H02H 9/00

[52] U.S. Cl. .......................... 361/57; 361/111

[58] Field of Search .......................... 361/2, 4–6, 18, 361/42, 54, 56, 57, 86, 87, 91, 93, 111; 324/520, 522, 536, 551, 76.39, 76.76; 315/DIG. 5, DIG. 7

[56] References Cited

U.S. PATENT DOCUMENTS 5,185,687 2/1993 Beihoff et al. .......................... 361/87

*Primary Examiner*—Ronald W. Leja
*Attorney, Agent, or Firm*—R. W. Slater

[57] ABSTRACT

Apparatus for detecting series arcs and output load faults in high frequency luminous tube power supplies and ballasts including wideband ringing and detector circuits for collecting the intense high frequency, pre-plasma noise energy associated with the initial avalanche phase of high frequency arc formation and a transient suppressor for delaying the triggering of power supply shut-down for up to the duration of the arc avalanche phase. Plural detectors for increased sensitivity and reliability over a variety of arc locations may be employed. Dual purpose detector input probes serve as over-voltage corona generators.

6 Claims, 2 Drawing Sheets

APPARATUS FOR DETECTING LUMINOUS TUBE AND POWER SUPPLY FAULTS WHERE GROUND FAULT CURRENTS MAY BE ABSENT

BACKGROUND OF THE INVENTION

The present invention relates to high voltage, high frequency power supplies of the type used to power neon and other gaseous luminous tubes as well as supplies used for ballasts in fluorescent lamps and the like. More specifically, the present invention pertains to a system for detecting certain unique 'non-ground' fault conditions which may not otherwise be detectable by conventional ground fault detectors/interruptors ("GFI") by reason that, literally, such conventional detectors rely on the presence of actual ground fault currents.

Conventional GFI circuits serve well in most neon signage 'failure/fault' contexts. For example, an 'electrical shock' is usually the result of inadvertent contact with neon sign's tube segment(s) or the wiring that interconnects these segments and the associated high voltage power supply. Such contact creates an abnormal 'fault' current path to ground which current is, in turn, utilized to trigger the ground fault interrupter (GFI) circuitry. (Indeed, 'shock', with its potentially harmful symptoms, is defined as a current flow through human tissue.) Other 'non-contact' failure modes may also cause ground fault conditions for which traditional GFI systems provide adequate protection. For instance, a winding-to-core short of the power supply transformer, or, contact between the luminous tube or interconnecting wiring and any ground-based object. Examples of conventional GFI systems include the present inventor's own U.S. Pat. Nos. 4,613,934 (current transformer in HV transformer ground return center-tap) and 5,349,273 (use of intrinsic transformer capacitance to detect ground fault current without resort to a transformer center-tap). See also U.S. Pat. No. 5,349,273 relating to neon tube dimmers and GFI circuitry for use therewith.

There are, however, other failure modes that may produce little or no false current to ground. For example, as set forth in applicant's pending application Ser. No. 08/028,277 filed on Mar. 9, 1993, a luminous tube segment may become dislodged or broken thereby partially or completely unloading the power supply which, in turn, could result in a potentially dangerous over-voltage condition. Applicant discovered that the harmonic content of the output waveform changes under such conditions and disclosed apparatus to utilize this finding to detect a faulted load condition.

The present invention pertains to yet another high frequency power supply failure mode herein denominated as "series arc". A "series arc" fault is, in its simplest form, literally an arc formed, or found, in series with some portion of the power supply load, output wiring, connectors or connections completing the output circuit. Also contemplated within the "series arc" category are arcs that bridge some portion of the high voltage output, wiring, or load thereby shunting that portion of the output circuitry. This latter form of series arc is often associated with failed insulation of one conductor that impinges upon a conductor of the opposite potential. Although defining a short circuit condition, this second family of faults nonetheless exhibits no current path to ground and consequently remains essentially an output circuit series phenomenon.

This condition in which the arcing bypasses all or a portion of the connected neon load is particularly insidious by reason that the total load voltage does not necessarily change beyond the normally expected limits. Therefore, not only does ordinary ground fault detection fail to protect against such faults, but conventional over-voltage protection that might otherwise detect a faulted, e.g. "open", load similarly fails to detect an 'out-of-range', or fault, condition.

Normal series arcs (i.e the first-noted class of arc, those literally in series with the output) most commonly occur when a connection between two neon tubes or a tube and the power supply opens. Under certain circumstances; namely, where the "opening" distance is greater than 5 to 20 mm, a series arc can not be maintained. Series breaches caused by mechanical impact often result in greater dislodgements and therefore a simple 'open-circuit' results, i.e. current stops and the sign goes dark. On the other hand, a more insidious series breach is the one caused by time, e.g. the corrosion to electrical connections that occurs despite connector design, contact plating, etc. Such arcs simply cannot be entirely avoided and are virtually always within the above-noted arc-defining distance.

A series arc, once formed, tends to grow in length by reason of the thermal and electrochemical action of the arc. The arc literally erodes the adjacent contacts thereby assuring, absent human intervention, that the once marginal 'opening' (e.g. occasioned by corrosion) will become a full-fledged gap. This gap will continue to sustain an arc for hours or even months until it grows beyond the above-noted arc-sustaining maximum. During such periods, electrical and acoustic noise will be produced by the arc. Further, substantial energy will be generated by reason of the volt-amp product associated with the gap/arc which must be dissipated in order to maintain temperatures within safe limits.

The present invention takes advantage of the above-noted electrical noise phenomenon to provide a means for detecting a series arc fault condition (significantly, in the context of a high frequency power supply) and, in response thereto, for terminating further power supply operation. That electrical arcing creates radio frequency (RF) noise is so well documented that it hardly requires repetition here. However, what is less well understood is the process of arc formation and, importantly to the present invention, the time-dependent relationship of the noise spectrum thus generated.

It has been recognized, at least as early as Van Best, U.S. Pat. No. 3,746,930, "that the noise component of the voltage across the discharge gap disappears when an arc occurs." See also Blade, U.S. Pat. No. 5,434,509, in which "avalanche" breakdown of air molecules is discussed with the conclusion reached that noise, particularly in the "higher frequency range" is "very short lived" and "decay(s) very rapidly".

Thus, an arc exhibits two distinctive phases. The first phase is best characterized as the arc formation phase, itself. It is characterized by the avalanche breakdown of, for example, the air molecules through which the arc shall be established. As alluded to, above, this phase is relatively short-lived. While its precise duration is a function of various physical factors, e.g. temperature, humidity, voltage, etc., it has been found that this first phase lasts only about one millisecond (1 mSec).

The second, post-formation phase of the arc is commonly referred to as the 'plasma' or arc 'thermalization' phase. As long as the arc is not extinguished, this phase can last indefinitely. In this latter phase, the prior avalanche breakdown of the air molecules had generated a free, unbound supply of moving electrons that defines the arc itself. Comparatively little RF noise is generated by plasma arcs. As the presence of noise forms the principle of operation of conventional RF noise based arc detectors; the absence of such noise can be problematic to proper arc detection.

Fortunately, this 'disappearance' of noise is only 'temporary' in connection with the great majority of applications to which this technology has heretofore been applied, e.g. all forms of electrical power distribution, lines, outlets, transformers etc. As discussed in another Blades U.S. Pat., No. 5,223,795, the zero crossings of each electrical cycle create "voids" in the arc. The arc, in short, 'de-thermalizes' and consequently a new arc must be created during each new half power cycle, typically, 120 times per second. In this manner, the avalanche condition is constantly being repeated which, in turn, results in the on-going generation of substantial HF noise. Representative illustrations of RF noise arc detection in the context of DC or low frequency AC arcing can be seen in the following U.S. Pat. Nos. 3,624,502; 3,820,018; 4,163,227; 4,191,921; 4,214,210; 4,466,071; 4,731,586; 4,775,839; 4,853,818; 4,897,607; 4,922,368; 5,087,909; 5,185,684; 5,252,927; 5,373,241; 5,381,098; 5,414,430; and, 5,432,455.

By contrast, the so-called 'disappearance' of noise is not temporary in the context of the present high frequency luminous tube power supply by reason of the comparatively shorter period of the high frequency waveform. At an operating frequency of 20 KHZ, for example, there is only 25 μSeconds between respective half-cycles—well below the decay time-constant of a thermalized arc. In short, the arc of a high frequency supply, once formed, does not self-extinguish between half-cycles and therefore the repetitive generation of HF noise associated with the onset of each new half-cycle does not occur. It will be appreciated that comparatively little high frequency noise is available for detection purposes beyond the first 1 mS pre-plasma interval. However, high frequency arcs are known to produce copious noise until thermalization has occurred.

High frequency supplies present yet other problems to noise-based arc detection. The most notable of these being the distributed capacitance of the luminous tube itself which acts, in concert with the wiring and intrinsic impedances of the supply, as a low pass filter. This filter effectively shunts (i.e. attenuates) the high frequency noise generated at any given arc site as a function of the distance from such site. As a series arc may occur at virtually any location along the luminous tube and its interconnecting wiring, the amount of high frequency energy available for detection correspondingly varies, again, depending on the relative proximity or spacing between the arc and detection circuitry.

Several embodiments of the present invention are proposed to address these and other unique problems presented by high frequency power supply arcing including the use of maximum bandwidth detection apparatus whereby substantial portions of the available RF noise energy may be applied to the detection process. Known systems, by reason of having an abundance of available noise energy, typically filter the noise spectrum according to criteria not directly related to detection sensitivity. In this manner a minimum amount of detector sensitivity is required which, in turn, obviates false triggering and related problems associated with high detector gain.

Another alternative to high gain detectors is the proposed adoption of multiple detectors, spaced for example at the ends of the luminous tube. Use of just two detectors assures that the maximum attenuation will be that occasioned by one-half the overall length of luminous tube and, by reason that most series arcs occur at the distal luminous tube connectors, most probably one of the detectors will be oriented in immediate proximity to the noise-inducing arc. Single detectors are also proposed, for example, positioned at the midpoint of a luminous tube segment. Additional detector gain may be required and to the extent that ordinary harmonic energy may falsely trigger such enhanced-gain detectors, means are provided to minimize the existence or conduction of such harmonic energy to the detector.

It is therefore an object to provide a means for the detection of a series arc, or a bridging series arc, in which no ground fault current may exist in connection with a high frequency luminous tube supply. It is a further object to minimize the gain of the arc detector whereby susceptibility to false triggering and harmonic energy shall be minimized. It is an object to detect the presence of such series arc condition substantially instantaneously whereby the detector will properly detect high frequency supply arcs that do not include repeated avalanche arc formations and whereby the arc remains thermalized after its initial formation. It is yet a further object that substantial portions of the available noise energy be utilized in the detection process and therefore that appropriate wide-band ringing circuitry be employed. Further objects include multiple detectors, enhanced gain detectors, and means for desensitizing detectors to extraneous or harmonic energy in certain applications and configurations.

These and other objects will become apparent from the figures and descriptions of the preferred embodiments that follow.

DESCRIPTION OF THE PREFERRED EMBODIMENT

Figure 1:
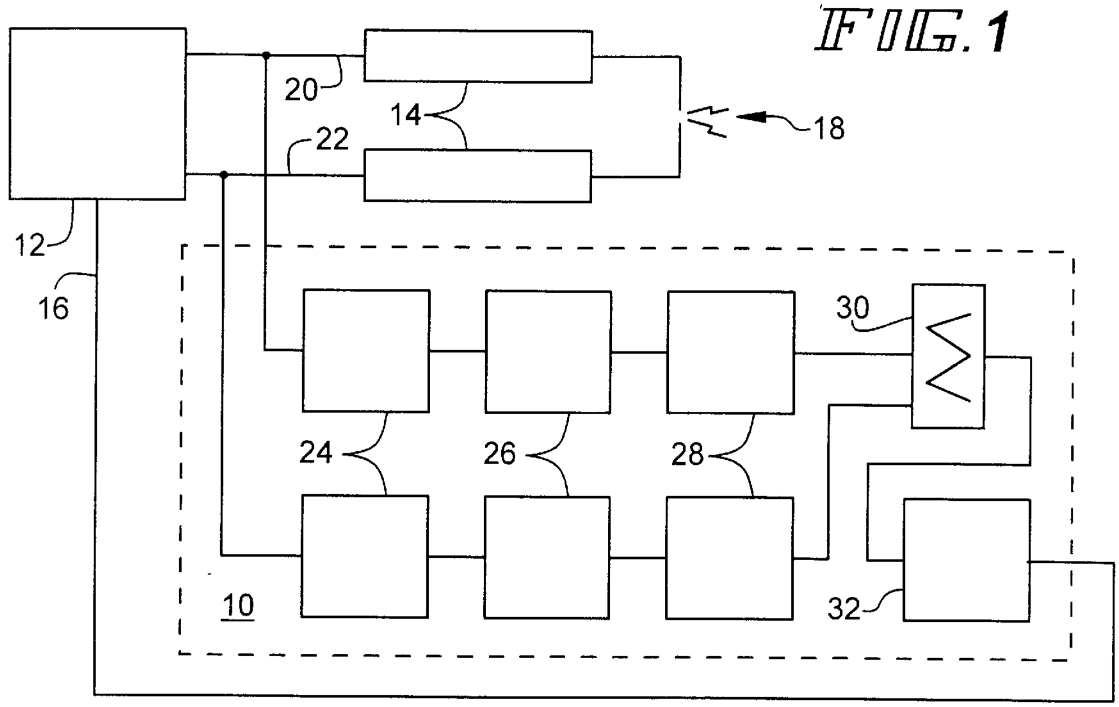
FIG. 1 is a block diagram of multiple series arc detector of the present invention.

FIG. 1 depicts in block form the dual series arc detector 10 of the present invention shown interconnected with a high frequency luminous tube power supply 12 and to a pair of series connected luminous tubes 14. It is understood that the present invention applies equally to other luminous tube arrangements, whether a single tube or a series/parallel combination of plural tubes.

Supply 12 may be of any conventional design although preferably the supply shall include a conventional ground fault interruptor (GFI) to which the present series arc detector may be interfaced at input 16. Input 16 triggers the 'shut-down' circuitry of the GFI system thereby terminating power supply operation in response to the detection of a series arc condition. In this connection it is expected that the present series arc system shall be implemented in combination with conventional GFI protection by reason that a non-arcing short, i.e. a direct short, will not generate an arc and therefore will not trigger the present series arc detector.

By combining the GFI and series arc functions, a single shut-down gate or switch may be employed.

For illustration, a breach in the series current path is shown at 18 between the adjacent ends of tubes 14. This breach is defined to be of sufficiently small dimension, e.g. less than 5–20mm, whereby an arc would reasonably be assumed to occur. It should be further noted that this arc could have been illustrated along either of the respective power supply high voltage output lines 20, 22 with series arc detection being similar to that described hereafter for the arc shown at 18. More specifically, as illustrated, each of the two inputs of detector 10 (connected respectively to lines 20 and 22) will see substantially equal amounts of arc-induced noise from arc 18. This noise will, in each instance, be attenuated by reason of the distributed capacitance of tubes 14 as the noise signal propagates along these tubes to the detector inputs.

By contrast, an arc on either (but not both) high voltage lines 20 or 22 will exhibit a proportionately larger noise signal on that input (*i.e.* where no attenuation will occur) as compared with the other input (i.e. where twice the attenuation through both tube segments 14 will occur). However, proper operation of detector 10 requires, only, that a sufficient noise signal be present on one of the inputs.

Each leg of the series arc detector includes a wide band ringing circuit 24, an RF detector 26, and a transient suppressor 28. The outputs from the respective transient suppressors are summed at 30, thereafter, applied to a threshold detector 32. When the summed output exceeds a predetermined level, an output to the high frequency supply at 16 terminates further supply operation. It will be appreciated that individual threshold detectors 32 may be connected to each transient suppressor 28 with the respective outputs thereof logically "OR'd" to provide a composite shut-down gating signal at 16. In this manner summer 30 is obviated in lieu of the above-noted "OR'ing".

Figure 2:
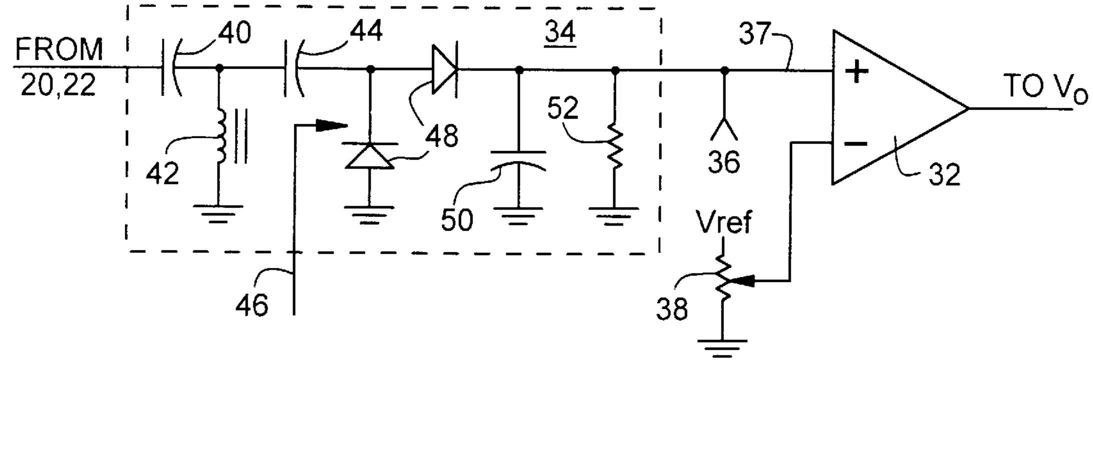
FIG. 2 is schematic representation of the multiple series arc detector of FIG. 1.

FIG. 2 is a schematic representation of the detector 10 with one leg of the detector, including elements 24, 26, and 28 of FIG. 1 shown within the dofted outline 34. The output from the second leg at 36 of the detector is combined and summed with the corresponding output of the first leg at 37 with the positive input of the threshold detector 32 defining a summing junction and serving as summer 30 (FIG. 1). Threshold detector 32 may be any conventional integrated comparator or operational amplifier with the threshold thereof being set by a potentiometer 38 or fixed resistors connected to the negative input thereof.

The wide-band ringing circuit 24 serves to literally 'capture' as much arc noise energy as possible consistent with eliminating any fundamental and power supply harmonic energy that would otherwise falsely trigger the detector. In one embodiment, the ringing circuit 24 is defined by a three-pole RLC network comprised of a two-pole LC input section, including series capacitor 40 and shunt inductor 42 followed by a single-pole RC section, including capacitor 44 and the effective input resistance of the subsequent detector/transient suppressor circuitry. More specifically, this load resistance (i.e. the input impedance seen by capacitor 44 as depicted by arrow 46) is approximately 6K ohms.

Typical component values are 2 pF for capacitor 40, 1 mH for inductor 42, and 27 pF for capacitor 44. These values result in a ringing frequency of 3.5 Mhz for the first 2 -pole section. The second RC section exhibits a corner frequency of about 1 Mhz. It has been determined that the above ringing frequency sufficiently attenuates the expected and ordinary fundamental and harmonic constituents of the power supply output while passing significant portions of the pre-plasma, arc-induced noise impulse. In this latter connection it should be noted that the noise spectrum may range into the Ghz region and therefore that a 3 Mhz ringing frequency passes most of this noise energy. The ringing frequency may be lowered, however, to about 0.5 Mhz to provide additional detection sensitivity without unduly increasing occurrences of false triggering. In no event should a ringing frequency below about ten times the operating frequency of the power supply be utilized. Further, as the magnitude of the noise voltage generally decreases with frequency, the ringing circuit may be configured in a bandpass configuration to limit the upper frequency response, for example, to 50 Mhz.

Still referring to FIG. 2, the detectors 26 (FIG. 1) are preferably configured as voltage doublers employing a pair of, for example, 1 N 4148 diodes 48 to achieve a greater range and higher detected output voltage. The output from these detectors is applied to the summer/threshold detector 32 through a pair of transient suppressors 28 (FIG. 1) Suppressors 28 are defined by the parallel, shunt combination of capacitor 50 and resistor 52 driven by the effective source impedance of detectors 26. Typical component values are 0.01 uF and 27K ohms, respectively. Transient suppressors 28, as their name implies, inhibit transient 'spikes' or other electrical phenomena from falsely triggering the arc detection apparatus of the present invention. The transient suppressors, however, must not have a time response of longer duration than the typical pre-plasma phase of the high frequency arc. Otherwise, a valid 'arc detection' signal from detectors 26 will not be passed to the subsequent processing circuitry, i.e. the summer 30 and threshold detector 32, by reason that such detected signal will have terminated (by reason of the demise of the pre-plasma phase of the arc) prior to its being passed for such subsequent processing. Consequently, the transient suppressors 28 should have a maximum suppression duration not exceeding about 0.5 mS.

It will be understood that other arrangements of the above-outlined elements are contemplated herein. For example, the transient suppression 28 function may be performed following detector signal summation and/or threshold detection at 30 and 32, respectively.

Figure 3:
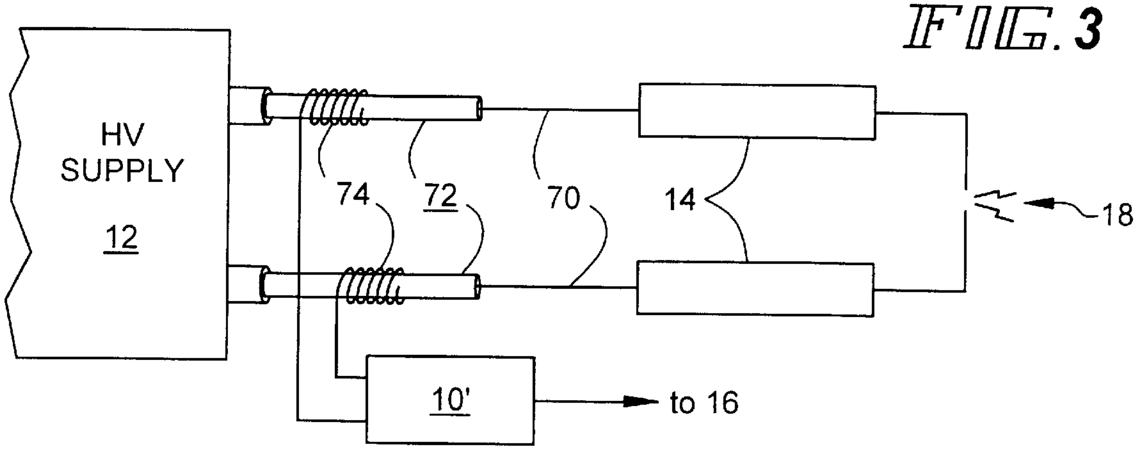
FIG. 3 is a block diagram of an alternative embodiment depicting the dual-function capacitive probes of the present invention.

FIG. 3 illustrates and alternative embodiment for the series arc detector described above and further including a dual-function capacitive probe arrangement that serves as set forth below, first, as the respective input capacitors 40 (FIG. 2) of the ringing circuit 24 and, second, as a corona gap for the detection of an over voltage condition. In this manner, the present series arc detector serves, additionally, as an over voltage detector thereby obviating a separate circuit for that purpose.

The apparatus of FIG. 3 is similar to that of FIG. 1 in that both systems utilize any conventional high frequency power supply 12 (preferably with GFI protection) and are shown connected to a series configuration of two luminous tubes 24. The hypothetical arc-producing gap 18 is also illustrated. The dual series arc detector 10 of FIG. 1 is replaced by a slightly modified dual series arc detector 10'. In fact, the noted modification is merely that the pair of ringing circuit input capacitors 40 (see FIG. 2) that comprise detector 10 have been omitted from detector 10'. In all other respects, detectors 10 and 10' may be considered identical.

Referring to FIG. 3, the interconnection between supply 12 and luminous tubes 14 is shown as a pair of conductors 70 having insulation 72 formed along at least a portion of the length of each conductor. Probes 74 are formed adjacent respective conductors 70 by winding an appropriate number of turns of wire around conductor insulation 72. Probes 74 are connected and define the inputs to detector 10'.

It will be appreciated that the windings forming probes 74 define a capacitance to the underlying conductor 70. This capacitance is determined, in conventional fashion, by the dimensions and dielectric constant of the insulation 72 and by the number and size of the windings defining each probe 74. Probe capacitances in the order of the above-discussed 2 pF ringing circuit input capacitors 40 are preferred and result in substantially similar performance of the circuits of FIGS. 1 and 3. In short, the probe capacitances in combination with the circuitry of detector 10' (FIG. 3) defines the detector 10 of FIG. 1.

As noted herein, should a gap, e.g. gap 18, exceed a maximum dimension of about 5–20 mm, no arc will occur. In such situation, power supply 12 may become 'unloaded' which, in turn, generally results in a substantial increase in the supply output voltage. As various deleterious effects may result from an over voltage condition, over voltage detectors are commonly included in luminous tube power supplies.

To this end, the arrangement of FIG. 3 serves in a dual capacity both as a series arc detector and as an over voltage detector. More specifically, probes 74 function as corona generators. Corona, like the incipient phase of an arc, produces high frequency noise that is detected, as described above, by detectors 10'. Probes 74, however, will not produce any corona until the power supply output voltage exceeds a pre-determined minimum. During normal operation, i.e. in which the luminous tubes are properly connected to and operating from supply 12, the supply output voltage will remain within normal limits, importantly, below the corona generating level. In the event that the supply becomes unloaded—with a corresponding rise in supply output voltage—corona generation will commence at probes 74 which, as discussed, will trigger supply shutdown.

Figure 4:
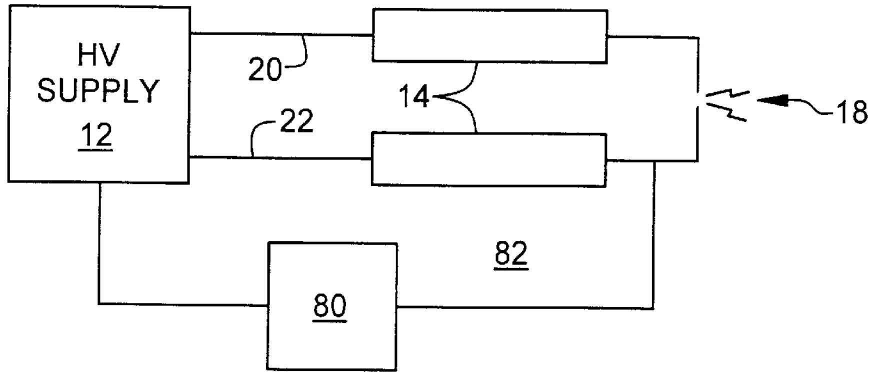
FIG. 4 is a block diagram of a single series arc detector of the present invention shown on a sign having a series connection of luminous tube segments; and, FIG. 5 is a block diagram of a single series arc detector of the present invention shown on a sign having a single luminous tube segment.
Figure 5:
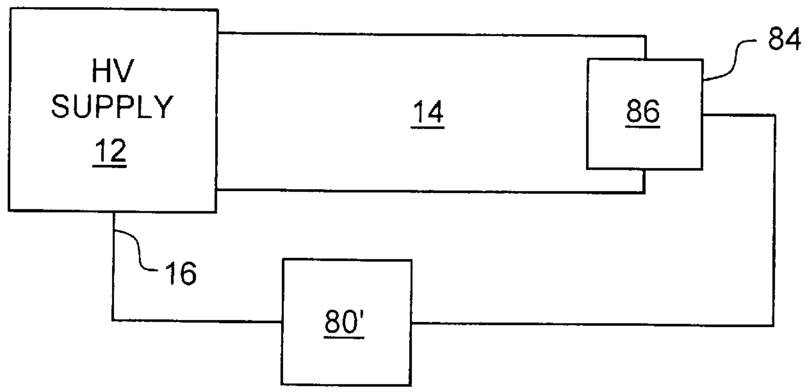

FIGS. 4 and 5 illustrate single detector embodiments of the present series arc detector. More specifically, FIG. 4 depicts the sign of, for example, FIG. 1 characterized by a pair of series-connected luminous tube segments while FIG. 5 illustrates the a similiar single detector used in connection with a neon sign having a single luminous tube.

The circuitry and operation of series arc detector 80 is substantially the same as that of detector 10 previously discussed except, in the first instance, the input to detector 10 is connected to the junction between series connected luminous tubes 14. It will be appreciated that detector 80 will respond equally to series arcs on either of the high voltage connections, 20 or 22. Such an arc will be attenuated through the respective tube segment 14 prior to connection (at 82 ) to detector 80. In this respect the detector 80 of FIG. 4 will respond to a series arc on either line 20 or 22 substantially the same as detector 10 of FIG. 1 responds to the series arc 18 between tube segments 14. And conversely, detector 80 (FIG. 4) will respond to series arc 18 substantially the same as detector 10 (FIG. 1) responds to a series arc on either high voltage line 20 or 22.

The series arc detector of FIG. 5 utilizes a capacitive probe 84 positioned adjacent luminous tube 86 preferably midway between the respective ends thereof. Probe 84 may advantageously be defined and employed as the ringing circuit input capacitance (40 of FIG. 2) substantially as described above with respect to the dual purpose probes 74 of FIG. 3. In this manner, detector 80' will omit such capacitance in the manner of detector 10'.

While the preferred embodiments have been described, various alternative embodiments may be utilized within the scope of the invention which is limited only by the following claims and their equivalents.

I claim:

1. Apparatus for detecting non-ground fault, series arcs in a high frequency luminous tube power supply, the supply having first and second terminal means for connecting a luminous tube load to the high frequency output thereof; the apparatus including wideband ringing means for collecting high frequency energy associated with the pre-plasma formation phase of a high frequency arc; detector means operatively connected to the ringing means for producing a signal representative of the magnitude of the energy collected by the ringing means; transient means for suppressing the output of the detector means for a period less than the pre-plasma phase of a high frequency arc; threshold means operatively associated with the ringing means for generating a power supply shut-down signal in response to the collected high frequency energy exceeding a predetermined level whereby operation of the high frequency power supply may be terminated in response to a non-ground fault, series arc condition characterized by a single, pre-plasma arc formation interval.

2. The apparatus for detecting non-ground fault, series arcs in the high frequency luminous tube power supply of claim 1 in which the ringing means for collecting high frequency energy includes first and second inputs connected, respectively, to the power supply first and second terminal means whereby the filtering effect of a length of luminous tube will be minimized for enhanced detection of the series arc.

3. The apparatus for detecting non-ground fault, series arcs in the high frequency luminous tube power supply of claim 1 including a luminous tube load connected to the output terminal means; and in which the ringing means for collecting high frequency energy includes first and second inputs, the first and second inputs operatively connected to discrete and seperate first and second terminals on the luminous tube load whereby the filtering effect of a length of luminous tube will be minimized for enhanced detection of the series arc.

4. The apparatus for detecting non-ground fault, series arcs in the high frequency luminous tube power supply of claim 1 including a luminous tube load having first and second terminals connected to the power supply output terminal means, the luminous tube load defining at least one point intermediate the first and second terminals; and in which the ringing means for collecting high frequency energy includes an input, the input operatively connected to said luminous tube intermediate point whereby the filtering effect of a length of luminous tube will be minimized for enhanced detection of the series arc.

5. The apparatus for detecting non-ground fault, series arcs in the high frequency luminous tube power supply of claim 1 including means for generating corona when the output voltage of the power supply exceeds a predetermined level; the corona generating means operatively connected to the at least one of the power supply terminal means and to the wide band ringing means, the corona causing the ringing, detector, transient, and threshold means to generate a shut-down output whereby the apparatus for detecting series arcs serves to detect and shut-down power supply operation in event of an over-voltage condition.

6. Apparatus for detecting non-ground fault, series arcs in a high frequency luminous tube power supply including means for detecting a single pre-plasma portion of a high frequency arc; means for shutting-down high frequency power supply operation operatively connected to the pre-plasma arc detection means; suppressor means for inhibiting operation of the shutting-down means for a predetermined interval whereby operation of the high frequency power supply will be automatically terminated in response only to a series arc condition.

* * * * *